US012699836B2

(12) United States Patent
Xu et al.

(10) Patent No.: US 12,699,836 B2
(45) Date of Patent: Aug. 4, 2026

(54) CONTENT GENERATION USING ENHANCED ACTOR-CRITIC MODELS

(71) Applicant: Coinbase, Inc., Oakland, CA (US)

(72) Inventors: Yifan Xu, Redmond, WA (US); Galina Alperovich, Prague (CZ); Varsha Mahadevan, Bengaluru (IN)

( * ) Notice: Subject to any disclaimer, the term of this patent is extended or adjusted under 35 U.S.C. 154(b) by 289 days.

(21) Appl. No.: 18/646,500

(22) Filed: Apr. 25, 2024

(65) Prior Publication Data

US 2025/0335701 A1      Oct. 30, 2025

(51) Int. Cl.
*G06F 40/40* (2020.01)
*G06F 40/186* (2020.01)

(52) U.S. Cl.
CPC ............ *G06F 40/186* (2020.01); *G06F 40/40* (2020.01)

(58) Field of Classification Search
CPC ............................... G06F 40/186; G06F 40/40
See application file for complete search history.

(56) References Cited

U.S. PATENT DOCUMENTS

| | | | |
|---|---|---|---|
| 2024/0037646 A1* | 2/2024 | Sheikh | G06N 5/043 |
| 2025/0086391 A1* | 3/2025 | Kempf | G06F 16/3347 |
| 2025/0111167 A1* | 4/2025 | Mcintyre | G06F 16/383 |

OTHER PUBLICATIONS

Raad Bin Tareaf et al., Accelerating Contextualization in AI Large Language Models Using Vector Databases, Jan. 17, 2024, International Conference on Information Networking, pp. 316-321 (Year: 2024).*
Akshara Ramprasad et al., Context-Aware Summarization for PDF Documents using Large Language Models, Apr. 18, 2024, International Conference on Expert Clouds and Applications, pp. 186-191 (Year: 2024).*

* cited by examiner

*Primary Examiner* — Tam T Tran
(74) *Attorney, Agent, or Firm* — Holland & Hart LLP

(57)      ABSTRACT

Methods, systems, and devices for content generation are described. Techniques described herein may support the use of multiple large language model (LLM) agents to generate content. For example, a first actor agent may generate a layout including one or more sections to fulfill a user-supplied query. A second actor agent may retrieve information, and a first critic agent may review the retrieved information to verify that the retrieved information fulfills the generated layout. If the retrieved information does not fulfill the layout, the second actor agent may obtain additional information. A third actor agent may use the retrieved information to generate a draft query response. A second critic agent may review the draft query response to determine if the draft query response is in accordance with user-supplied guidelines. The second actor agent may revise the query response if the query response is not in accordance with the user-supplied guidelines.

20 Claims, 9 Drawing Sheets

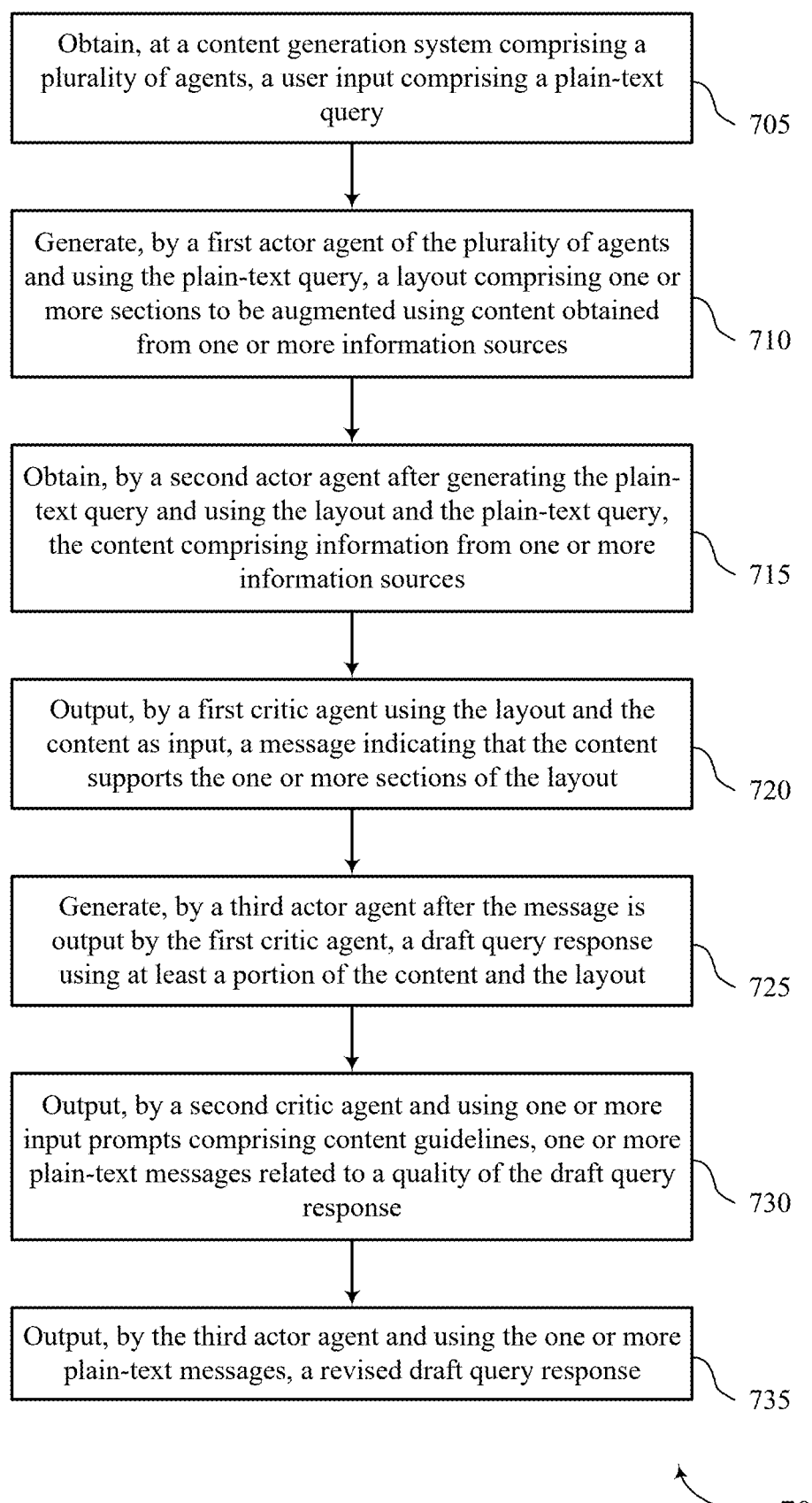

Obtain, at a content generation system comprising a plurality of agents, a user input comprising a plain-text query
705

Generate, by a first actor agent of the plurality of agents and using the plain-text query, a layout comprising one or more sections to be augmented using content obtained from one or more information sources
710

Obtain, by a second actor agent after generating the plain-text query and using the layout and the plain-text query, the content comprising information from one or more information sources
715

Output, by a first critic agent using the layout and the content as input, a message indicating that the content supports the one or more sections of the layout
720

Generate, by a third actor agent after the message is output by the first critic agent, a draft query response using at least a portion of the content and the layout
725

Output, by a second critic agent and using one or more input prompts comprising content guidelines, one or more plain-text messages related to a quality of the draft query response
730

Output, by the third actor agent and using the one or more plain-text messages, a revised draft query response
735

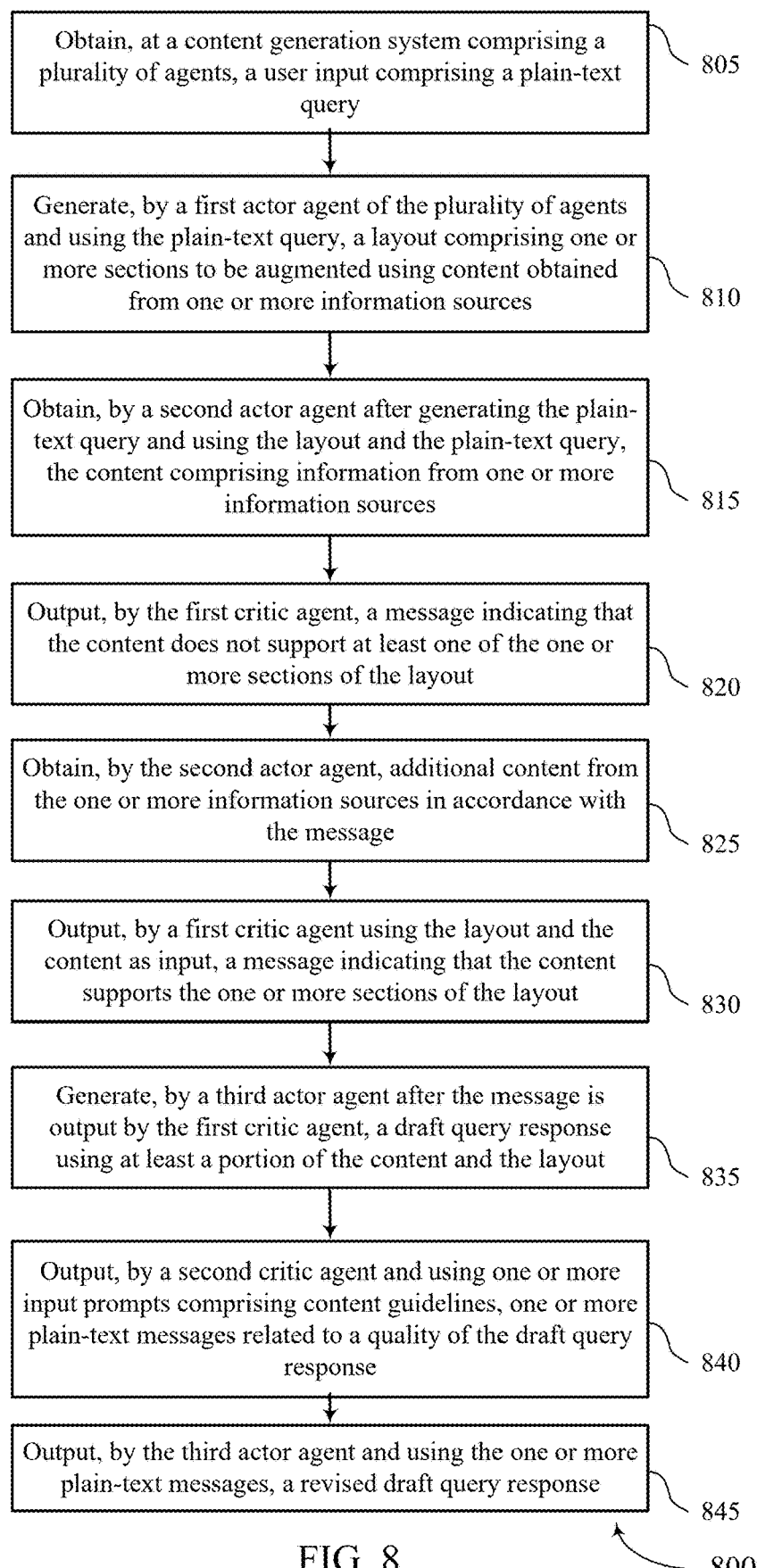

Obtain, at a content generation system comprising a plurality of agents, a user input comprising a plain-text query — 805

Generate, by a first actor agent of the plurality of agents and using the plain-text query, a layout comprising one or more sections to be augmented using content obtained from one or more information sources — 810

Obtain, by a second actor agent after generating the plain-text query and using the layout and the plain-text query, the content comprising information from one or more information sources — 815

Output, by the first critic agent, a message indicating that the content does not support at least one of the one or more sections of the layout — 820

Obtain, by the second actor agent, additional content from the one or more information sources in accordance with the message — 825

Output, by a first critic agent using the layout and the content as input, a message indicating that the content supports the one or more sections of the layout — 830

Generate, by a third actor agent after the message is output by the first critic agent, a draft query response using at least a portion of the content and the layout — 835

Output, by a second critic agent and using one or more input prompts comprising content guidelines, one or more plain-text messages related to a quality of the draft query response — 840

Output, by the third actor agent and using the one or more plain-text messages, a revised draft query response — 845

FIG. 8     — 800

CONTENT GENERATION USING ENHANCED ACTOR-CRITIC MODELS

FIELD OF TECHNOLOGY

The present disclosure relates generally to data management, including techniques for content generation using enhanced actor-critic models.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

BRIEF DESCRIPTION OF THE DRAWINGS

FIGS. 7 through 9 show flowcharts illustrating methods that support content generation using enhanced actor-critic models in accordance with aspects of the present disclosure.

DETAILED DESCRIPTION

Figure 1:
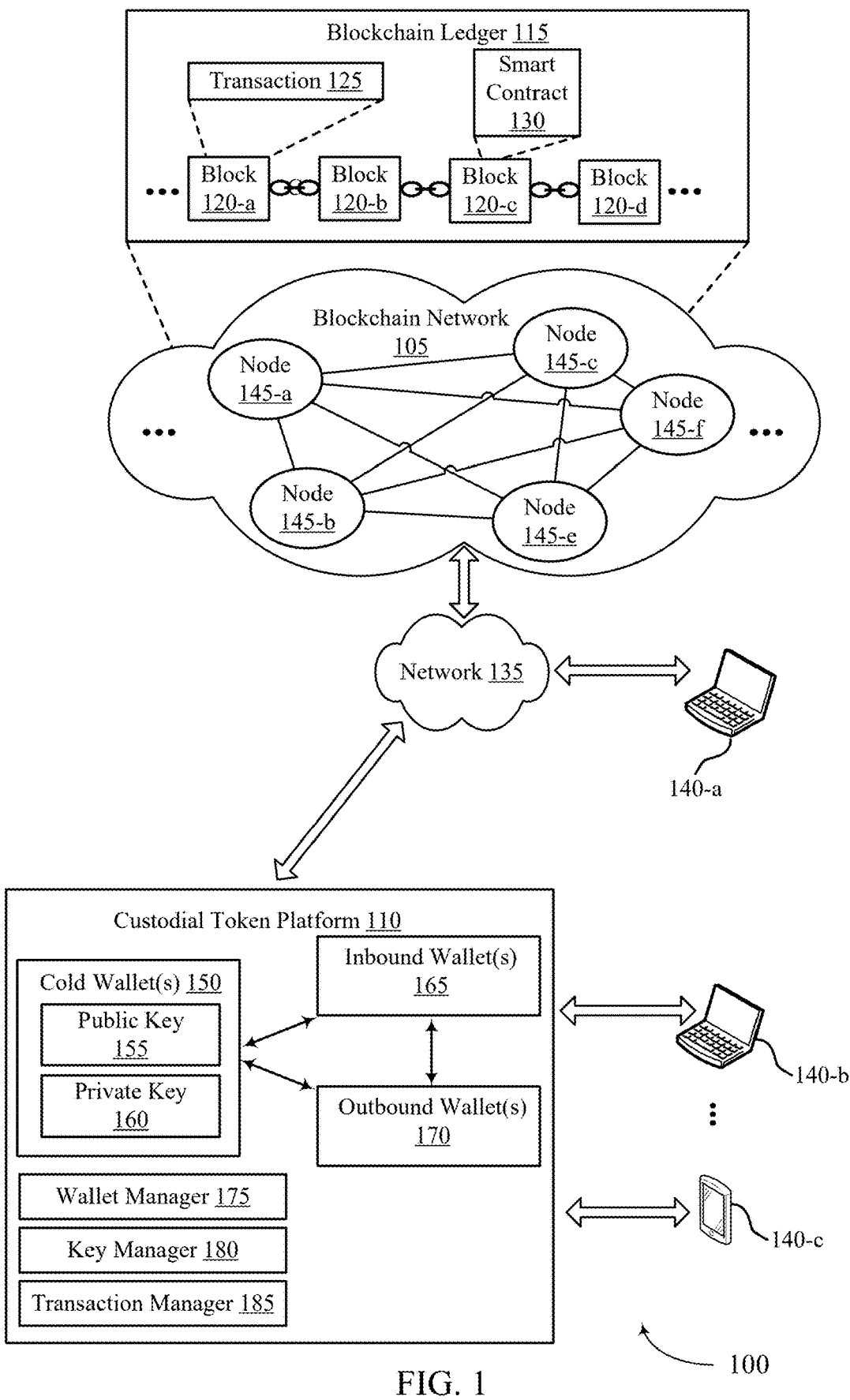
FIG. 1 illustrates an example of a computing environment that supports content generation using enhanced actor-critic models in accordance with aspects of the present disclosure.

A user may use a large language model (LLM) to generate content, such as information, responses to user-submitted queries, blog posts, and the like. For example, a custodial token platform may support a website or application with a graphical user interface (GUI) with information about one or more crypto tokens (e.g., a value, a supply, a market cap, a description, history, hold time, popularity, and the like). An administrator of the custodial token platform may use an LLM to generate the information for display via the GUI, which may decrease the time and cost associated with maintaining the custodial token platform. In some examples, however, the LLM may generate incomplete or hallucinated information. That is, the LLM may obtain information from one or more sources, and may generate extraneous information (e.g., incorrect information that is not supported by the one or more sources). Additionally, the LLM may generate the information with a format or phrasing that does not follow one or more guidelines (e.g., vocabulary, grammar, or formatting guidelines) desired by the user, the platform, or another entity.

Accordingly, techniques described herein may allow for the user to use multiple generation LLM agents (e.g., actor agents) and verification LLM agents (e.g., critic agents) to generate content, such as a response to a user-supplied query. For example, in a research stage, a first actor agent (e.g., a layout designer agent) may generate a layout including one or more sections to fulfill the user-supplied query. A second actor agent (e.g., a reporter agent) may retrieve information (e.g., content) from one or more sources and may verify that the retrieved information is not hallucinated. A first critic agent (e.g., a content reviewer) may review the retrieved information to verify that the retrieved information fulfills all sections of the generated layout (e.g., includes enough information and correct information that may be used as a basis of content for the layout). If the retrieved information does not fulfill some or all sections of the generated layout, the first critic agent may instruct the second actor agent to obtain additional information (e.g., by adjusting a search prompt used by the second actor agent). The second actor agent and the first critic agent may repeat the content retrieval and verification process one or more times until the first critic agent determines that the retrieved content fulfills all sections of the generated layout.

In a content generation stage, a third actor agent (e.g., a news writer) may use the retrieved information to generate a draft query response (e.g., in accordance with one or more user-supplied guidelines, the generated layout, or both). A second critic agent (e.g., a content/style reviewer) may review the draft query response to determine if the draft query response is in accordance with the user-supplied guidelines. If the second critic agent determines that the draft query response is not in accordance with the user-supplied guidelines, the second critic agent may provide the third actor agent with one or more plain-text instructions to improve the draft query response. The third actor agent may accordingly revise the draft query response in accordance with the instructions. The third actor agent and the second critic agent may repeat the query response generation and revision procedure one or more times until the second critic agent determines that the query response is in accordance with the user-supplied guidelines. Accordingly, the user may obtain a final query response that includes correct information that fulfills a generated layout and that follows the user-supplied guidelines. These and other techniques are described in further detail with respect to the figures.

FIG. 1 illustrates an example of a computing environment 100 that supports content generation using enhanced actor-critic models in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 (e.g., a node 145-a, a node 145-b, a node 145-c, a node 145-e, and a node 145-f) of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-a, 120-b, 120-c, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-a, 140-b, or 140-c) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-d) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-a may provide user inputs via the computing device 140-a, which may result in commands, data, or any combination thereof being communicated via the network 135 to the computing system custodial token platform 110, the blockchain network 105, or both. Additionally, or alternatively, a computing device 140-a may output (e.g., display) data or other information received from the custodial token platform 110, the blockchain network 105, or both. A user of a computing device 140-a may, for example, use the computing device 140-a to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

As described herein, the custodial token platform 110 may implement and support content generation using one or more LLMs. For example, the custodial token platform 110 may include one or more LLMs for generating content (e.g., content for display via a computing device 140-*a*, a computing device 140-*b*, or a computing device 140-*c*). The one or more LLMs may generate the content based on receiving a user input (e.g., from a manager or a consumer of the custodial token platform 110).

As described herein, an LLM may be a machine learning (ML), neural network, and/or artificial intelligence (AI) program that may recognize and generate text. For example, an LLM may be trained using a dataset including text from one or more sources (e.g., external internet sources, sources internal to the custodial token platform 110, and so on). The LLM may be trained to recognize patterns (e.g., text patterns) in the text such that the LLM may generate words, characters, sentences, and so on that follow grammatical rules, sentence structures, and the like represented in the text. In some examples, LLMs may be further trained to perform tasks, such as interpreting questions, analyzing or summarizing text, providing responses, and so on.

In some examples, an LLM may generate information that is incomplete, not credible, and/or not reliable. For example, the LLM may hallucinate information that may not be found in one or more sources (e.g., may generate untrue information based on language pattern recognition), or may provide non-verified data from sources that are not verified to be trustworthy by a user of the LLM. Accordingly, techniques described herein may enable the user to generate content that is valid, relevant, and complete using one or more LLM agents (e.g., actor agents and critic agents). Various aspects of the techniques described herein are described with using an LLM to support content associated with the custodial token platform 110, but it should be understood that the techniques described herein may be implemented in other contexts.

Figure 2:
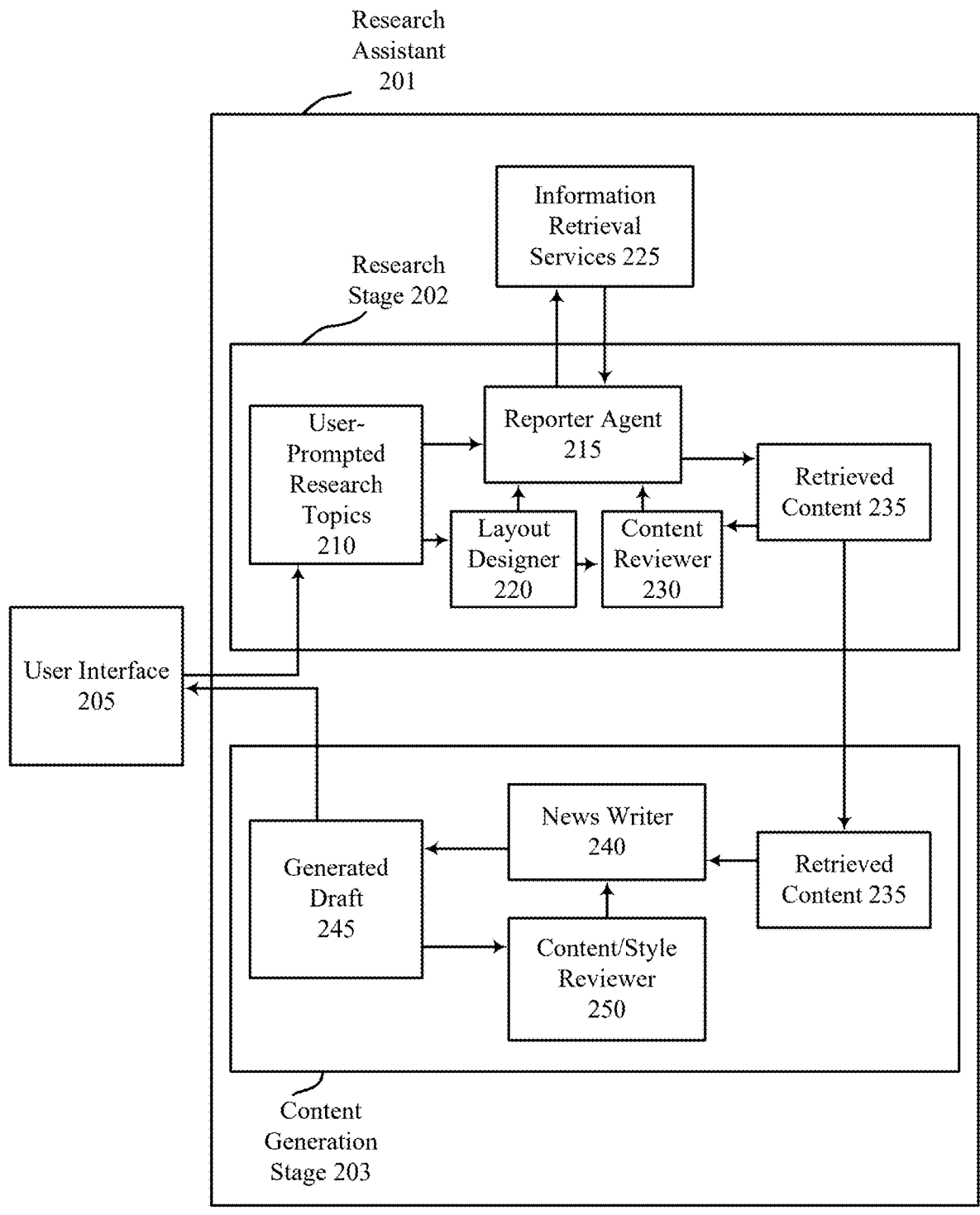
FIG. 2 shows an example of a block diagram that supports content generation using enhanced actor-critic models in accordance with aspects of the present disclosure.

FIG. 2 shows an example block diagram of a computing environment 200 that supports content generation using enhanced actor-critic models in accordance with aspects of the present disclosure. The computing environment 200 may implement or may be implemented by aspects of the computing environment 100. For example, computing environment 200 may be implemented by a custodial token platform, which may be an example of a custodial token platform 110 as described with reference to FIG. 1. Additionally, or alternatively, the computing environment 200 may be implemented by one or more servers that support a content generation system.

In some examples, a user (e.g., a consumer or operator of a custodial token platform) may generate content autonomously by leveraging collaborative work of one or more specialized LLMs (e.g., LLM agents). The user may access the functioning of each LLM agent to produce coherent, credible, and contextually relevant content (e.g., without human intervention). The LLM agents may be configured to communicate with or access information produced by the other LLM agents to support the techniques described herein.

As described herein, an LLM agent may be more specialized and focused than some other LLMs. For example, a non-agent LLM may be designed (e.g., trained) to handle a broad range of tasks, such as language translation, creative writing, and so on. An LLM agent may be tailored (e.g., trained) to perform specific functions within a larger system (e.g., a larger system of LLM agents). In other words, each LLM agent may be a fragment of a larger LLM, where each LLM agent may be fine-tuned to perform particular tasks such as information retrieval, content review, draft generation, and contextual analysis. Accordingly, by using multiple LLM agents as part of an LLM system, the LLM system may perform more efficient and targeted handling of tasks in a content creation process as compared to a non-agent LLM.

As described herein, a group of synchronized LLM agents may include one or more actor agents and one or more critic agents. That is, an LLM system may implement an "actor-critic" model. An actor agent may perform action-oriented tasks, such as information retrieval, draft generation, and other active content creation processes. A critic agent may perform evaluation and quality control-related tasks, such as assessing work (e.g., content) provided by actor agents and providing feedback or directives to actor agents for improvement.

The actor and critic agents described herein may be advanced language models that may understand and generate human-like text. In some examples, feedback provided by critic agents may be plain-text responses, such as "yes" or "no" responses or sentences such as "This part of your response could be clearer," or "You did a great job explaining this concept" (e.g., rather than numerical scores). Such feedback, which may be input into the other agents as input prompts, may enable the actor agents to revise generated content to increase a clarity or validity of the content (e.g., by interpreting and generating text in accordance with LLM functionalities). In some examples, natural language feedback (e.g., feedback akin to human advice) may enable the actor agents to refine output during an inference (e.g., content generation) phase.

Accordingly, the actor-critic model with plain-text feedback may provide real-time improvements to generated content, as compared to reinforcement learning techniques (e.g., in which training signals or parameter update gradients, which may be provided to an actor agent during a training phase). Further, in reinforcement learning techniques, a critic agent may be discarded following a training procedure, which may disable any improvement to generated content following the training procedure. Such plain-text feedback may enable AI (e.g., the LLM agents) to improve output (e.g., even when model parameters are frozen following a training and deployment) in a way that human users may understand and interact with.

In some examples, as illustrated with reference to FIG. 2, a user may generate content by interacting with a research assistant 201. The research assistant 201 may be one or more entities (e.g., LLM agents, data sources, memories) configured to perform content generation as described herein. The user may interact with the research assistant 201 via a user interface 205. The user interface 205 may be a website or application displayed via a GUI, including a text field in which the user may input a plain-text query and a result field via which the research assistant 201 may output a final query response. The user interface 205 may include an application programming interface (API), a generative pre-trained transformer (GPT), and/or a messaging application (e.g., Slack).

In some examples, the user may provide a plain-text query to the research assistant 201 via the user interface 205. As an illustrative example, if the user would like the research assistant 201 to generate a blog post regarding smart contracts, the user may provide an instruction such as "Generate a blog post titled Smart Contracts: The Future of Automated Agreements." The plain-text query may be stored in a user-prompted research topics 210 storage.

In a research stage 202, the research assistant 201 may use the user prompted research topics 210 to retrieve content including information related to the plain-text query. For example, a layout designer 220 (e.g., a first actor agent) may obtain the plain-text query and may generate a query response layout including one or more sections to be filled in by the research assistant 201. As an illustrative example, for the smart contract blog post, the layout designer 220 may determine that retrieved content for the blog post may fulfill an introduction section, an information section (e.g., a section titled "Smart Contracts: The Future of Automated Agreements" to include background information on smart contracts), a relevant information section (e.g., a section titled "How does this connect to Coinbase?" including additional information of practical applications of smart contracts), and a conclusion section. The layout designer 220 may provide the layout to a reporter agent 215 (e.g., a second actor agent) and a content reviewer 230 (e.g., a first critic agent).

The reporter agent 215 may obtain the layout and the plain-text query (e.g., from the user-prompted research topics 210 storage) and may obtain content (e.g., information) from one or more information retrieval services 225. For example, the reporter agent 215 may provide an API request with search questions (e.g., novel search questions, research questions) to the information retrieval services 225, and the information retrieval services 225 may respond to the search questions with information (e.g., content). The information retrieval services 225 may include an online or external search engine or database (e.g., Google enterprise search) and/or an internal search engine or authenticated database (e.g., an internal GPT Knowledge-Based Intelligent Information & Engineering Systems (KES)).

The reporter agent 215 may accordingly collect, verify, and analyze information from authenticated databases and online sources. For example, the reporter agent 215 may obtain retrieved content 235 from the information retrieval services 225 and may deploy algorithms to extract and cross-verify information from one or more sources. In some examples, the reporter agent 215 may determine that the retrieved content 235 is verified if information in the retrieved content is present in two or more sources (e.g., authenticated sources identified by the information retrieval services). Thus, the reporter agent 215 may increase accuracy and reduce a risk of incorporating hallucinated data in the retrieved content 235. In some examples, the retrieved content 235 may include titles, summaries, bullet points, keywords, excerpts, and the like from the authenticated sources.

The reporter agent 215 may store the verified retrieved content 235 in a shared memory or storage accessible by at least the reporter agent 215, the content reviewer 230, and a news writer 240 (e.g., a third actor agent). The content reviewer 230 (e.g., a layout editor) may accordingly obtain the retrieved content 235 from the shared memory and may structure and organize the information gathered by the reporter agent 215 (e.g., using the generated layout), which may increase a logical coherence and thematic relevance of the retrieved content 235. For example, the content reviewer 230 may organize data (e.g., the retrieved content 235) into the layout and identify gaps and/or redundancies in the retrieved content 235 based on how the retrieved content 235 fulfills the layout. The content reviewer 230 may therefore provide information to the reporter agent 215 regarding structural and thematic integrity of the retrieved content 235.

For example, the content reviewer 230 may signal the reporter agent 215 to refine a search by obtaining additional or more relevant information from the information retrieval services 225. In some examples, the content reviewer 230 may output a "no" to the reporter agent 215 if the retrieved content 235 does not sufficiently fulfill the layout, and may output a "yes" to the reporter agent 215 if the retrieved content 235 does sufficiently fulfill the layout. Additionally, or alternatively, the content reviewer 230 may provide one or more plain-text messages to the reporter agent 215 identifying information (e.g., one or more layout sections) for which the reporter agent 215 may obtain additional information. Accordingly, the output of the content reviewer 230 may function as an input prompt to the reporter agent 215.

Accordingly, the reporter agent 215 may refine the research questions (e.g., to focus on the additional information requested by the content reviewer 230). The reporter agent 215 may obtain the additional information and store the additional information in the retrieved content 235 storage for review by the content reviewer 230. The content reviewer 230 and the reporter agent 215 may repeat an information retrieval, verification, storage, reviewing, and feedback process one or more times (e.g., until the content reviewer 230 determines that the retrieved content 235 sufficiently fulfills the sections of the layout). Accordingly, the retrieved content 235 may have a logical and well-structured flow, which may facilitate effective content generation during a content generation stage 203.

If the content reviewer 230 determines that the retrieved content 235 (e.g., and any additional information obtained by the reporter agent 215) satisfies the layout (e.g., contains enough information to sufficiently fill in all layout sections), the content reviewer may output a message indicating that the retrieved content 235 is satisfactory. For example, the content reviewer may output a message such as "yes."

In response to the content reviewer 230 determining that the retrieved content 235 is approved, a news writer 240 (e.g., a third actor agent) may obtain the retrieved content 235 (e.g., including any additional content obtained by the reporter agent 215) from the shared storage. The news writer 240 may generate a draft query response (e.g., a primary draft of the content) based on the plain-text query and linguistic and/or stylistic norms, such as one or more user-provided guidelines. The user-provided guidelines may include vocabulary, grammar, and/or formatting guidelines, or one or more other guidelines related to a desired content of the query response. In some examples, the news writer 240 may generate a draft query response in accordance with the layout. For example, the news writer 240 may generate content for each layout section created by the layout designer 220. The news writer 240 may ensure fidelity to the sourced information (e.g., the retrieved content 235) by comparing the content in a generated draft 245 with the retrieved content 235 to check that all information in the generated draft 245 is found in the retrieved content 235. Such techniques may reduce hallucinations in the generated draft 245.

The generated draft 245 may be provided to a content/style reviewer 250. For example, the news writer 240 may store the generated draft 245 in a shared storage accessible by the content/style reviewer 250 and the news writer 240. The content/style reviewer 250 may review the generated draft 245 and evaluate adherence to the user-provided guidelines (e.g., content publication policy and guidelines provided by the user). The content/style reviewer 250 may assess the generated draft 245 and provide a list of improvement points highlighting areas of the generated draft 245 that may not align with styling or ethical publication guidelines provided by the user (e.g., the user-provided guidelines).

The content/style reviewer 250 may relay the list of improvement points to the news writer 240. For example, the content/style reviewer may provide plain-text feedback such as "The introduction should include more background information" or "Revise the conclusion section to be more objective." The news writer 240 may accordingly revise the generated draft 245 in accordance with the feedback provided by the content/style reviewer 250 and may provide a revised generated draft 245 to the content/style reviewer 250 (e.g., via the shared memory). The news writer 240 and the content/style reviewer 250 may repeat a draft reviewing, feedback, and draft revision process one or more times (e.g., until the content/style reviewer 250 determines that the generated draft 245 is in line with the user-provided guidelines).

Upon approval from the content/style reviewer 250, the research assistant 201 may output the generated draft 245 to the user interface 205. The user may accordingly read, publish, or otherwise share the generated draft 245. By allowing inter-agent communication (e.g., actor and critic agents collaborating through communication channels and shared memory) and synchronization (e.g., synchronized algorithms in which an output of a first agent may be an input for a second agent), the collaborative content generation mechanisms described herein may enable a user to obtain accurate, complete, and properly stylized content in response to a user-provided plain-text query.

Figure 3:
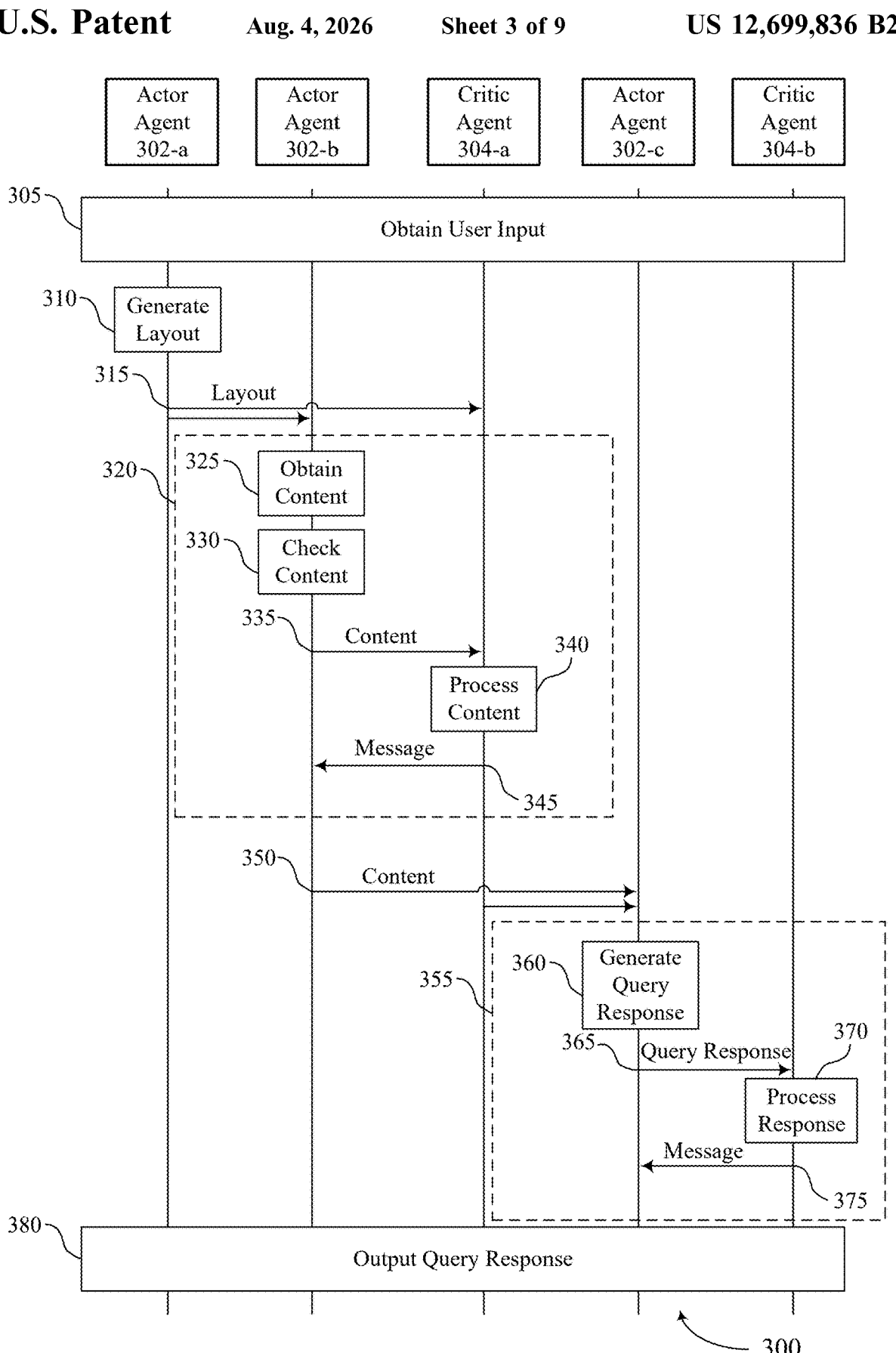
FIG. 3 shows an example of a process flow that supports content generation using enhanced actor-critic models in accordance with aspects of the present disclosure.

FIG. 3 shows an example of a process flow 300 that supports content generation using enhanced actor-critic models in accordance with aspects of the present disclosure. The process flow 300 may implement or may be implemented by aspects of the computing environment 100 or the computing environment 200. For example, the process flow 300 may be implemented by a custodial token platform, which may be an example of a custodial token platform 110 as described with reference to FIG. 1.

In the following description of the process flow 300, the operations between the actor agents 302 and the critic agents 304 may occur in a different order than the example order shown and, in some examples, may be performed by one or more different devices other than those shown as examples.

Some operations also may be omitted from the process flow 300, and other operations may be added to the process flow 300. Further, although some operations or signaling may be shown to occur at different times for discussion purposes, these operations may actually occur at the same time.

At 305, a content generation system including one or more agents (e.g., an actor agent 302-*a*, an actor agent 302-*b*, an actor agent 302-*c*, a critic agent 304-*a*, and a critic agent 304-*b*) may obtain a user input including a plain-text query. The plain-text query may be a prompt requesting for one or more agents to generate content. The one or more agents may be examples of or respective derivations of an LLM (e.g., LLM agents).

At 310, the actor agent 302-*a* may generate a layout. The layout may include one or more sections to be augmented using content obtained from one or more information sources. The actor agent 302-*a* may generate the layout in response to the user input. For example, if the user input requests for the content generation system to generate a post describing a research topic, the layout generator may generate one or more sections to be included in the post (e.g., an introduction, body, and conclusion). At 315, the actor agent 302-*a* may provide the layout to the one or more agents (e.g., the actor agent 302-*b*, the critic agent 304-*a*, the actor agent 302-*c*). For example, the actor agent 302-*a* may store the layout in a shared storage accessible by the actor agent 302-*b*, the critic agent 304-*a*, and/or the actor agent 302-*c*.

At 320, the actor agent 302-*b* and the critic agent 304-*a* may perform one or more operations to obtain and approve content for a query response to the user input. For example, at 325, the actor agent 302-*b* may obtain the content including information from one or more information sources (e.g., publicly available information sources, one or more internal information sources, or both).

At 330, the actor agent 302-*b* may perform a check procedure of the content. For example, the actor agent 302-*b* may determine whether each piece of information in the content is included in at least two of the one or more information sources. Additionally, or alternatively, the actor agent 302-*b* may compare the content to a verified information source to confirm that the content is correct (e.g., factually accurate).

At 335, the actor agent 302-*b* may provide the content to the critic agent 304-*a*. For example, the actor agent 302-*b* may store the content in a shared storage (e.g., a first memory) that is accessible by the critic agent 304-*a* (e.g., and the actor agent 302-*b* and the actor agent 302-*c*). At 340, the critic agent 304-*a* may process the content (e.g., after the content is stored in the first memory). For example, the critic agent 304-*a* may determine whether the content supports one or more sections of the layout.

At 345, the critic agent 304-*a* may output a message to the actor agent 302-*b* indicating whether the content supports the one or more sections of the layout. For example, the critic agent 304-*a* may output a "no" if the content does not support the one or more sections of the layout (e.g., and/or one or more suggestions to retrieve additional content). The critic agent 304-*a* may output a "yes" if the content does support the one or more sections of the layout.

In some examples, the actor agent 302-*b* and the critic agent 304-*a* may repeat the operations of 320 one or more times. For example, if the critic agent 304-*a* determines that the content does not support the layout, the critic agent may output a message to actor agent 302-*b* indicating that the content does not support the layout. The actor agent 302-*b* may accordingly obtain additional content from the one or more information sources in accordance with the message. The critic agent 304-*a* may process the content (e.g., including the additional content). This process may be repeated until the critic agent 304-*a* determines that the content supports the layout.

At 350, the actor agent 302-*b* and/or the critic agent 304-*a* may provide the content to the actor agent 302-*c*. For example, the actor agent 302-*b* and/or the critic agent 304-*a* may store the content in the first memory.

At 355, the actor agent 302-*c* and the critic agent 304-*b* may perform one or more operations to generate and revise a draft query response. For example, at 360, the actor agent 302-*b* may generate a draft query response using at least a portion of the content (e.g., including the additional content). The draft query response may be in accordance with the layout and/or one or more input prompts (e.g., user-provided guidelines such as grammar guidelines, language to be included from the draft query response, language to be excluded from the draft query response, formatting guidelines, and so on).

At 365, the actor agent 302-*c* may provide the draft query response to the critic agent 304-*b*. For example, the actor agent 302-*c* may store the draft query response in a shared storage (e.g., a second memory) accessible by the critic agent 304-*b* (e.g., and the actor agent 302-*c*).

At 370, the critic agent 304-*b* may process the draft query response (e.g., after the draft query response is stored in the second memory). For example, the critic agent 304-*b* may process the draft query response to determine if the draft query response satisfies the user input and/or the one or more input prompts (e.g., user-provided guidelines).

At 375, the critic agent 304-*b* may output one or more plain-text messages to the actor agent 302-*c*. For example, if the critic agent 304-*b* determines that a quality of the draft query response is insufficient (e.g., does not meet the one or more input prompts), the critic agent 304-*b* may output one or more messages providing recommendations to improve the quality of the draft query response. If the critic agent 304-*b* determines that a quality of the draft query response is sufficient (e.g., meets the one or more input prompts), the critic agent 304-*b* may output one or more messages providing approval of the quality of the draft query response.

The actor agent 302-*c* and the critic agent 304-*b* may repeat the operations of 355 one or more times. For example, if the critic agent 304-*a* provides plain-text messages including recommendations to improve a quality of the draft query response, the actor agent 302-*c* may generate a revised draft query response. The actor agent 302-*c* may provide the revised draft query response to the critic agent 304-*b*, and the critic agent may process the revised draft query response and provide one or more additional messages related to the quality of the draft query response (e.g., a quality related to the input prompts, such as content guidelines).

At 380, if the critic agent 304-*b* approves of a quality of the draft query response or the revised draft query response, the content generation system may output the approved query response. For example, the content generation system may display the approved draft query response via a GUI for view by the user.

Figure 4:
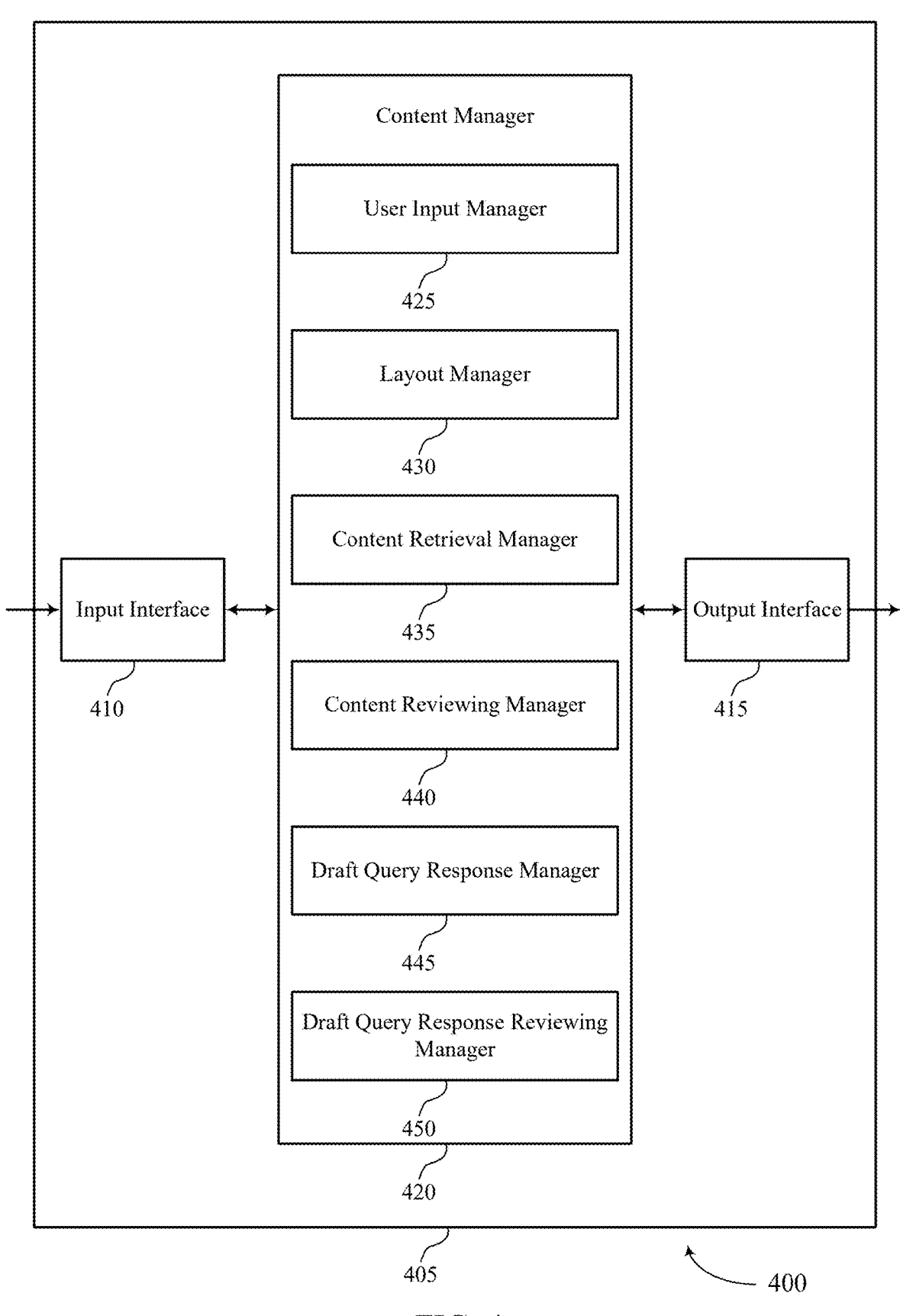
FIG. 4 shows a block diagram of an apparatus that supports content generation using enhanced actor-critic models in accordance with aspects of the present disclosure.

FIG. 4 shows a block diagram 400 of a system 405 that supports content generation using enhanced actor-critic models in accordance with aspects of the present disclosure. The system 405 may include an input interface 410, an output interface 415, and a content manager 420. The system 405, or one or more components of the system 405 (e.g., the input interface 410, the output interface 415, the content manager 420), may include at least one processor, which may be coupled with at least one memory, to support the described techniques. Each of these components may communicate, directly or indirectly, with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, transactions, or any other form of encoded information) from other systems or devices. The input interface 410 may send signaling corresponding to (e.g., representative of or otherwise based on) such input signaling to other components of the user system 405 for processing. For example, the input interface 410 may transmit such corresponding signaling to the content manager 420 to support content generation using enhanced actor-critic models. In some cases, the input interface 410 may be a component of a communication interface 610 as described with reference to FIG. 6.

The output interface 415 may manage output signaling for the system 405. For example, the output interface 415 may receive signaling from other components of the system 405, such as the content manager 420, and may transmit such output signaling corresponding to (e.g., representative of or otherwise based on) such signaling to other systems or devices. In some cases, the output interface 415 may be a component of a communication interface 610 as described with reference to FIG. 6.

For example, the content manager 420 may include a user input manager 425, a layout manager 430, a content retrieval manager 435, a content reviewing manager 440, a draft query response manager 445, a draft query response reviewing manager 450, or any combination thereof. In some examples, the content manager 420, or various components thereof, may be configured to perform various operations (e.g., receiving, monitoring, transmitting) using or otherwise in cooperation with the input interface 410, the output interface 415, or both. For example, the content manager 420 may receive information from the input interface 410, send information to the output interface 415, or be integrated in combination with the input interface 410, the output interface 415, or both to receive information, transmit information, or perform various other operations as described herein.

The content manager 420 may support content generation in accordance with examples as disclosed herein. The user input manager 425 may be configured as or otherwise support a means for obtaining, at a content generation system comprising a plurality of agents, a user input comprising a plain-text query. The layout manager 430 may be configured as or otherwise support a means for generating, by a first actor agent of the plurality of agents and using the plain-text query, a layout comprising one or more sections to be augmented using content obtained from one or more information sources. The content retrieval manager 435 may be configured as or otherwise support a means for obtaining, by a second actor agent after generating the plain-text query and using the layout and the plain-text query, the content comprising information from one or more information sources. The content reviewing manager 440 may be configured as or otherwise support a means for outputting, by a first critic agent using the layout and the content as input, a message indicating that the content supports the one or more sections of the layout. The draft query response manager 445 may be configured as or otherwise support a means for generating, by a third actor agent after the message is output by the first critic agent, a draft query response using at least a portion of the content and the layout. The draft query response reviewing manager 450 may be configured as or otherwise support a means for outputting, by a second critic agent and using one or more input prompts comprising content guidelines, one or more plain-text messages related to a quality of the draft query response. The draft query response manager 445 may be configured as or otherwise support a means for outputting, by the third actor agent and using the one or more plain-text messages, a revised draft query response.

Figure 5:
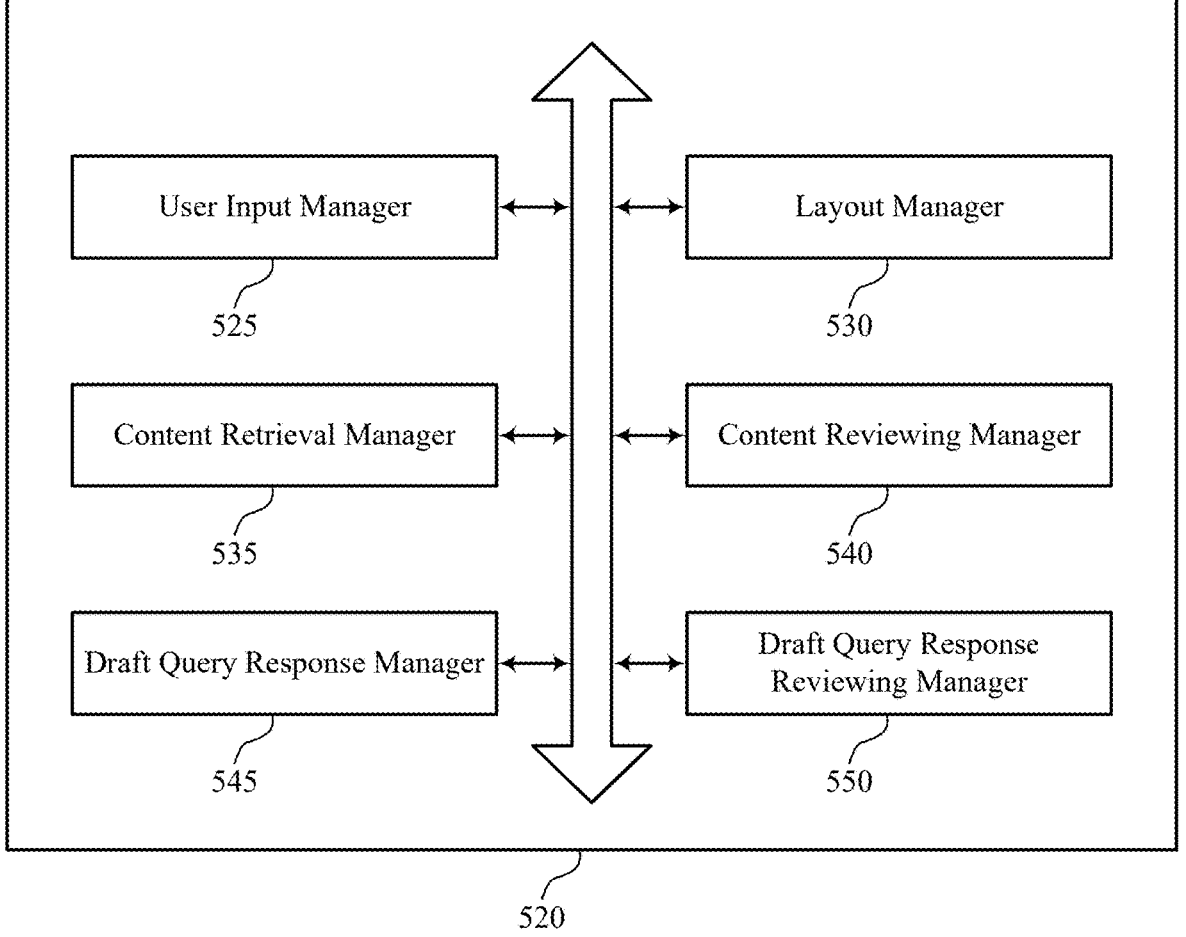
FIG. 5 shows a block diagram of a content manager that supports content generation using enhanced actor-critic models in accordance with aspects of the present disclosure.

FIG. 5 shows a block diagram 500 of a content manager 520 that supports content generation using enhanced actor-critic models in accordance with aspects of the present disclosure. The content manager 520 may be an example of aspects of a system 405 or a content manager 420, or both, as described herein. The content manager 520, or various components thereof, may be an example of means for performing various aspects of content generation using enhanced actor-critic models as described herein. For example, the content manager 520 may include a user input manager 525, a layout manager 530, a content retrieval manager 535, a content reviewing manager 540, a draft query response manager 545, a draft query response reviewing manager 550, or any combination thereof. Each of these components may communicate, directly or indirectly, with one another (e.g., via one or more buses, communications links, communications interfaces, or any combination thereof).

The content manager 520 may support content generation in accordance with examples as disclosed herein. The user input manager 525 may be configured as or otherwise support a means for obtaining, at a content generation system comprising a plurality of agents, a user input comprising a plain-text query. The layout manager 530 may be configured as or otherwise support a means for generating, by a first actor agent of the plurality of agents and using the plain-text query, a layout comprising one or more sections to be augmented using content obtained from one or more information sources. The content retrieval manager 535 may be configured as or otherwise support a means for obtaining, by a second actor agent after generating the plain-text query and using the layout and the plain-text query, the content comprising information from one or more information sources. The content reviewing manager 540 may be configured as or otherwise support a means for outputting, by a first critic agent using the layout and the content as input, a message indicating that the content supports the one or more sections of the layout. The draft query response manager 545 may be configured as or otherwise support a means for generating, by a third actor agent after the message is output by the first critic agent, a draft query response using at least a portion of the content and the layout. The draft query response reviewing manager 550 may be configured as or otherwise support a means for outputting, by a second critic agent and using one or more input prompts comprising content guidelines, one or more plain-text messages related to a quality of the draft query response. In some examples, the draft query response manager 545 may be configured as or otherwise support a means for outputting, by the third actor agent and using the one or more plain-text messages, a revised draft query response.

In some examples, the content reviewing manager 540 may be configured as or otherwise support a means for outputting, by the first critic agent, a message indicating that the content does not support at least one of the one or more sections of the layout. In some examples, the content retrieval manager 535 may be configured as or otherwise support a means for obtaining, by the second actor agent, additional content from the one or more information sources in accordance with the message.

In some examples, the draft query response manager 545 may be configured as or otherwise support a means for generating, by the third actor agent, the revised draft query response in accordance with the one or more plain-text messages. In some examples, the draft query response reviewing manager 550 may be configured as or otherwise support a means for outputting, by the second critic agent, one or more additional plain-text messages related to a quality of the revised draft query response in accordance with the one or more input prompts comprising the content guidelines.

In some examples, the content retrieval manager 535 may be configured as or otherwise support a means for performing, by the second actor agent, a check procedure of the content, wherein performing the check procedure comprises determining whether the information is included in at least two of the one or more information sources.

In some examples, the content retrieval manager 535 may be configured as or otherwise support a means for storing, by the second actor agent, the content in a first memory, wherein the first memory is accessible by the second actor agent, the first critic agent, and the third actor agent. In some examples, the content reviewing manager 540 may be configured as or otherwise support a means for processing, by the first critic agent after the content is stored in the first memory, the content to determine whether the content supports the one or more sections of the layout.

In some examples, the draft query response manager 545 may be configured as or otherwise support a means for storing, by the third actor agent, the draft query response in a second memory, wherein the second memory is accessible by the third actor agent and the second critic agent. In some examples, the draft query response reviewing manager 550 may be configured as or otherwise support a means for processing, by the second critic agent after the content is stored in the second memory, the draft query response for generating the one or more plain-text messages.

In some examples, to support generating the draft query response, the draft query response manager 545 may be configured as or otherwise support a means for generating, by the third actor agent, the draft query response using both the one or more input prompts comprising the content guidelines and the at least the portion of the content.

In some examples, the one or more input prompts comprising the content guidelines comprise grammar guidelines, language to be included from the draft query response, language to be excluded from the draft query response, formatting guidelines, or any combination thereof.

In some examples, the one or more information sources comprise one or more publicly available information sources, one or more internal information sources, or both.

In some examples, the first actor agent, the second actor agent, the third actor agent, the first critic agent, the second critic agent, or any combination thereof are respective derivations of a large language model.

Figure 6:
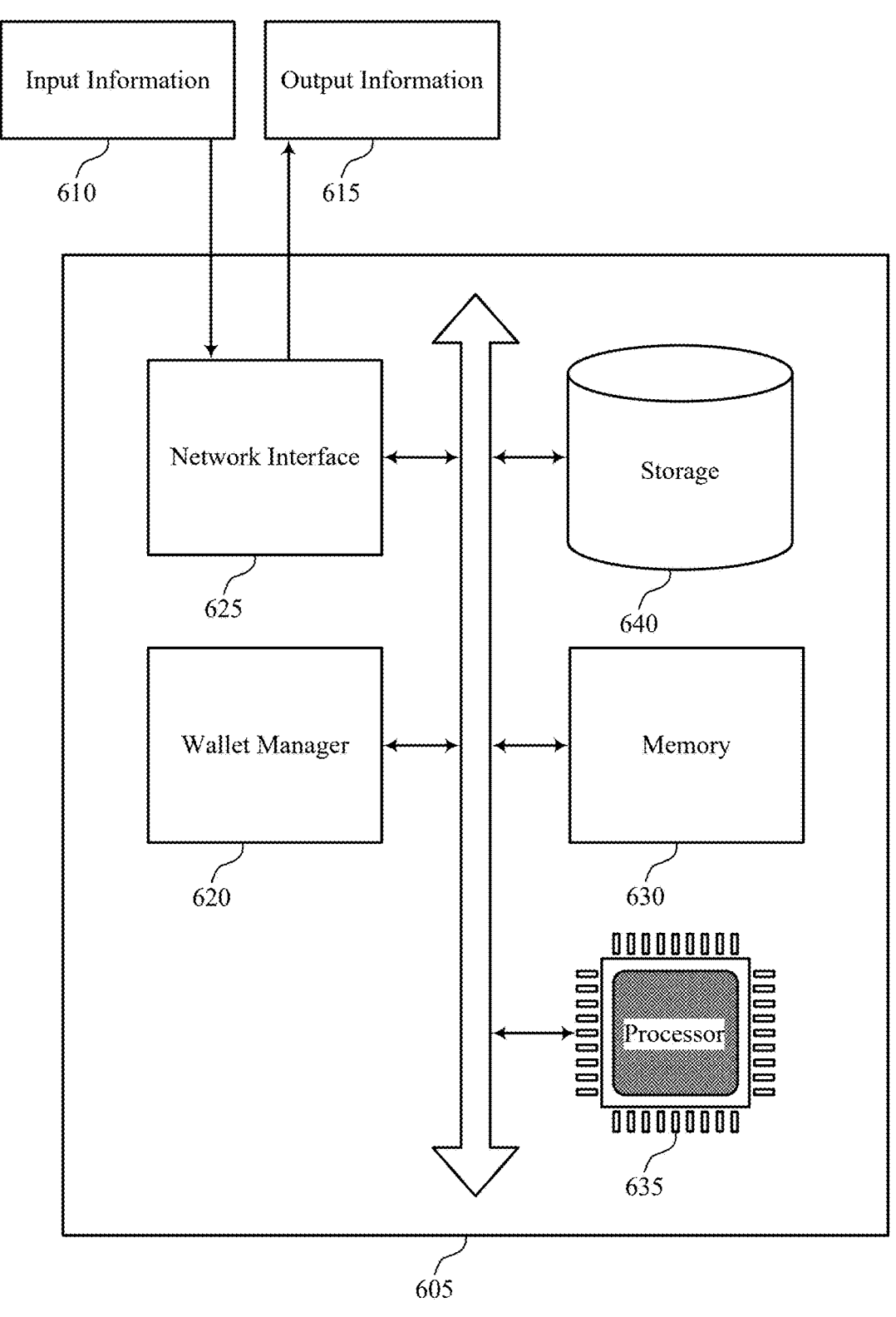
FIG. 6 shows a diagram of a system including a device that supports content generation using enhanced actor-critic models in accordance with aspects of the present disclosure.

FIG. 6 shows a diagram 600 of a system 605 that supports content generation using enhanced actor-critic models in accordance with aspects of the present disclosure. The system 605 may be an example of or include components of a system 405 as described herein. The system 605 may include components data processing and data communications including components, such as a content manager 620, an input information 610, an output information 615, a network interface 625, at least one memory 630, at least one processor 635, and a storage 640. Each of these components may communicate, directly or indirectly, with one another (e.g., via one or more buses, communications links, communications interfaces, or any combination thereof). The system 605 may represent or may be an example of one or more servers that support model generation, training, and execution as described herein.

The network interface 625 may enable the system 605 to exchange information (e.g., input information 610, output information 615, or both) with other systems or devices (not shown). For example, the network interface 625 may enable the system 605 to connect to a network (e.g., a network 135 as described herein). The network interface 625 may include one or more wireless network interfaces, one or more wired network interfaces, or any combination thereof.

Memory 630 may include RAM, ROM, or both. The memory 630 may store computer-readable, computer-executable software including instructions that, when executed, cause at least one processor 635 to perform various functions described herein, such as functions supporting content generation using enhanced actor-critic models. In some cases, the memory 630 may contain, among other things, a basic input/output system (BIOS), which may control basic hardware or software operation such as the interaction with peripheral components or devices. In some cases, the memory 630 may be an example of aspects of one or more components of a custodial token platform 110 as described with reference to FIG. 1. The memory 630 may be an example of a single memory or multiple memories. For example, the system 605 may include one or more memories 630.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in at least one memory 630 to perform various functions (e.g., functions or tasks supporting content generation using enhanced actor-critic models). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. The processor 635 may be an example of a single processor or multiple processors. For example, the system 605 may include one or more processors 635.

Storage 640 may be configured to store data that is generated, processed, stored, or otherwise used by the system 605. In some cases, the storage 640 may include one or more HDDs, one or more SDDs, or both. In some examples, the storage 640 may be an example of a single database, a distributed database, multiple distributed databases, a data store, a data lake, or an emergency backup database. In some examples, the storage 640 may be an example of one or more components described with reference to FIG. 1.

The content manager 620 may support content generation in accordance with examples as disclosed herein. For example, the content manager 620 may be configured as or otherwise support a means for obtaining, at a content generation system comprising a plurality of agents, a user input comprising a plain-text query. The content manager 620 may be configured as or otherwise support a means for generating, by a first actor agent of the plurality of agents and using the plain-text query, a layout comprising one or more sections to be augmented using content obtained from one or more information sources. The content manager 620 may be configured as or otherwise support a means for obtaining, by a second actor agent after generating the plain-text query and using the layout and the plain-text query, the content comprising information from one or more information sources. The content manager 620 may be configured as or otherwise support a means for outputting, by a first critic agent using the layout and the content as input, a message indicating that the content supports the one or more sections of the layout. The content manager 620 may be configured as or otherwise support a means for generating, by a third actor agent after the message is output by the first critic agent, a draft query response using at least a portion of the content and the layout. The content manager 620 may be configured as or otherwise support a means for outputting, by a second critic agent and using one or more input prompts comprising content guidelines, one or more plain-text messages related to a quality of the draft query response. The content manager 620 may be configured as or otherwise support a means for outputting, by the third actor agent and using the one or more plain-text messages, a revised draft query response.

By including or configuring the content manager 620 in accordance with examples as described herein, the system 605 may support techniques for content generation, which may result in improved user experience related to improved quality of generated content and improved utilization of processing capability.

The content manager 620 may include an application (e.g., "app"), program, software, extension, or other component which is configured to facilitate communications with a custodial token platform 110 on a server, one or more nodes of a blockchain network 105, other systems 605, and other devices or systems. For example, the content manager may be an application executable on the system 605, and the content manager 620 may be configured to receive data from a custodial token platform 110, transmit data to the custodial token platform 110, process such data, and cause presentation of such data to a user via a user interface 625. The content manager 620 may be an example of a wallet application, a wallet device, or both, and may be associated with a wallet address and may access or use a private key to sign messages to facilitate transfer of crypto tokens, messages, transactions, or the like via a blockchain distributed data store.

FIG. 7 shows a flowchart illustrating a method 700 that supports content generation using enhanced actor-critic models in accordance with aspects of the present disclosure. The operations of the method 700 may be implemented by a user device or its components as described herein. For example, the operations of the method 700 may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 705, the method may include obtaining, at a content generation system comprising a plurality of agents, a user input comprising a plain-text query. The operations of 705 may be performed in accordance with examples as disclosed herein. In some examples, aspects of the operations of 705 may be performed by a user input manager 525 as described with reference to FIG. 5.

At 710, the method may include generating, by a first actor agent of the plurality of agents and using the plain-text query, a layout comprising one or more sections to be augmented using content obtained from one or more information sources. The operations of 710 may be performed in accordance with examples as disclosed herein. In some examples, aspects of the operations of 710 may be performed by a layout manager 530 as described with reference to FIG. 5.

At 715, the method may include obtaining, by a second actor agent after generating the plain-text query and using the layout and the plain-text query, the content comprising information from one or more information sources. The operations of 715 may be performed in accordance with examples as disclosed herein. In some examples, aspects of the operations of 715 may be performed by a content retrieval manager 535 as described with reference to FIG. 5.

At 720, the method may include outputting, by a first critic agent using the layout and the content as input, a message indicating that the content supports the one or more sections of the layout. The operations of 720 may be performed in accordance with examples as disclosed herein. In some examples, aspects of the operations of 720 may be performed by a content reviewing manager 540 as described with reference to FIG. 5.

At 725, the method may include generating, by a third actor agent after the message is output by the first critic agent, a draft query response using at least a portion of the content and the layout. The operations of 725 may be performed in accordance with examples as disclosed herein. In some examples, aspects of the operations of 725 may be performed by a draft query response manager 545 as described with reference to FIG. 5.

At 730, the method may include outputting, by a second critic agent and using one or more input prompts comprising content guidelines, one or more plain-text messages related to a quality of the draft query response. The operations of 730 may be performed in accordance with examples as disclosed herein. In some examples, aspects of the operations of 730 may be performed by a draft query response reviewing manager 550 as described with reference to FIG. 5.

At 735, the method may include outputting, by the third actor agent and using the one or more plain-text messages, a revised draft query response. The operations of 735 may be performed in accordance with examples as disclosed herein. In some examples, aspects of the operations of 735 may be performed by a draft query response manager 545 as described with reference to FIG. 5.

FIG. 8 shows a flowchart illustrating a method 800 that supports content generation using enhanced actor-critic models in accordance with aspects of the present disclosure. The operations of the method 800 may be implemented by a user device or its components as described herein. For example, the operations of the method 800 may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 805, the method may include obtaining, at a content generation system comprising a plurality of agents, a user input comprising a plain-text query. The operations of 805 may be performed in accordance with examples as disclosed herein. In some examples, aspects of the operations of 805 may be performed by a user input manager 525 as described with reference to FIG. 5.

At 810, the method may include generating, by a first actor agent of the plurality of agents and using the plain-text query, a layout comprising one or more sections to be augmented using content obtained from one or more information sources. The operations of 810 may be performed in accordance with examples as disclosed herein. In some examples, aspects of the operations of 810 may be performed by a layout manager 530 as described with reference to FIG. 5.

At 815, the method may include obtaining, by a second actor agent after generating the plain-text query and using the layout and the plain-text query, the content comprising information from one or more information sources. The operations of 815 may be performed in accordance with examples as disclosed herein. In some examples, aspects of the operations of 815 may be performed by a content retrieval manager 535 as described with reference to FIG. 5.

At 820, the method may include outputting, by the first critic agent, a message indicating that the content does not support at least one of the one or more sections of the layout. The operations of 820 may be performed in accordance with examples as disclosed herein. In some examples, aspects of the operations of 820 may be performed by a content reviewing manager 540 as described with reference to FIG. 5.

At 825, the method may include obtaining, by the second actor agent, additional content from the one or more information sources in accordance with the message. The operations of 825 may be performed in accordance with examples as disclosed herein. In some examples, aspects of the operations of 825 may be performed by a content retrieval manager 535 as described with reference to FIG. 5.

At 830, the method may include outputting, by a first critic agent using the layout and the content as input, a message indicating that the content supports the one or more sections of the layout. The operations of 830 may be performed in accordance with examples as disclosed herein. In some examples, aspects of the operations of 830 may be performed by a content reviewing manager 540 as described with reference to FIG. 5.

At 835, the method may include generating, by a third actor agent after the message is output by the first critic agent, a draft query response using at least a portion of the content and the layout. The operations of 835 may be performed in accordance with examples as disclosed herein. In some examples, aspects of the operations of 835 may be performed by a draft query response manager 545 as described with reference to FIG. 5.

At 840, the method may include outputting, by a second critic agent and using one or more input prompts comprising content guidelines, one or more plain-text messages related to a quality of the draft query response. The operations of 840 may be performed in accordance with examples as disclosed herein. In some examples, aspects of the operations of 840 may be performed by a draft query response reviewing manager 550 as described with reference to FIG. 5.

At 845, the method may include outputting, by the third actor agent and using the one or more plain-text messages, a revised draft query response. The operations of 845 may be performed in accordance with examples as disclosed herein. In some examples, aspects of the operations of 845 may be performed by a draft query response manager 545 as described with reference to FIG. 5.

Figure 9:
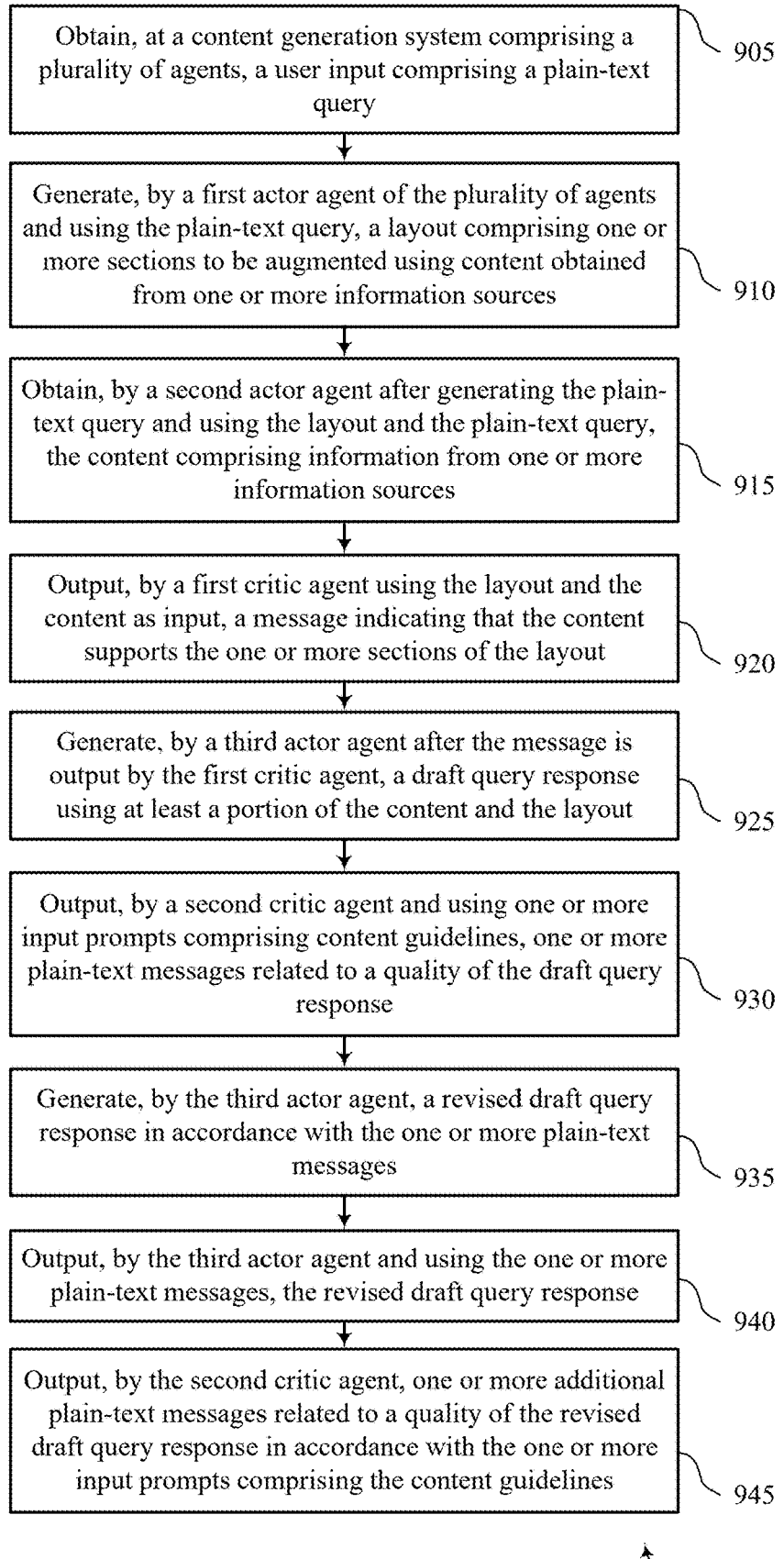

FIG. 9 shows a flowchart illustrating a method 900 that supports content generation using enhanced actor-critic models in accordance with aspects of the present disclosure.

The operations of the method 900 may be implemented by a user device or its components as described herein. For example, the operations of the method 900 may be performed by a user device as described with reference to FIGS. 1 through 6. In some examples, a user device may execute a set of instructions to control the functional elements of the user device to perform the described functions. Additionally, or alternatively, the user device may perform aspects of the described functions using special-purpose hardware.

At 905, the method may include obtaining, at a content generation system comprising a plurality of agents, a user input comprising a plain-text query. The operations of 905 may be performed in accordance with examples as disclosed herein. In some examples, aspects of the operations of 905 may be performed by a user input manager 525 as described with reference to FIG. 5.

At 910, the method may include generating, by a first actor agent of the plurality of agents and using the plain-text query, a layout comprising one or more sections to be augmented using content obtained from one or more information sources. The operations of 910 may be performed in accordance with examples as disclosed herein. In some examples, aspects of the operations of 910 may be performed by a layout manager 530 as described with reference to FIG. 5.

At 915, the method may include obtaining, by a second actor agent after generating the plain-text query and using the layout and the plain-text query, the content comprising information from one or more information sources. The operations of 915 may be performed in accordance with examples as disclosed herein. In some examples, aspects of the operations of 915 may be performed by a content retrieval manager 535 as described with reference to FIG. 5.

At 920, the method may include outputting, by a first critic agent using the layout and the content as input, a message indicating that the content supports the one or more sections of the layout. The operations of 920 may be performed in accordance with examples as disclosed herein. In some examples, aspects of the operations of 920 may be performed by a content reviewing manager 540 as described with reference to FIG. 5.

At 925, the method may include generating, by a third actor agent after the message is output by the first critic agent, a draft query response using at least a portion of the content and the layout. The operations of 925 may be performed in accordance with examples as disclosed herein. In some examples, aspects of the operations of 925 may be performed by a draft query response manager 545 as described with reference to FIG. 5.

At 930, the method may include outputting, by a second critic agent and using one or more input prompts comprising content guidelines, one or more plain-text messages related to a quality of the draft query response. The operations of 930 may be performed in accordance with examples as disclosed herein. In some examples, aspects of the operations of 930 may be performed by a draft query response reviewing manager 550 as described with reference to FIG. 5.

At 935, the method may include generating, by the third actor agent, a revised draft query response in accordance with the one or more plain-text messages. The operations of 935 may be performed in accordance with examples as disclosed herein. In some examples, aspects of the operations of 935 may be performed by a draft query response manager 545 as described with reference to FIG. 5.

At 940, the method may include outputting, by the third actor agent and using the one or more plain-text messages, the revised draft query response. The operations of 940 may be performed in accordance with examples as disclosed herein. In some examples, aspects of the operations of 940 may be performed by a draft query response manager 545 as described with reference to FIG. 5.

At 945, the method may include outputting, by the second critic agent, one or more additional plain-text messages related to a quality of the revised draft query response in accordance with the one or more input prompts comprising the content guidelines. The operations of 945 may be performed in accordance with examples as disclosed herein. In some examples, aspects of the operations of 945 may be performed by a draft query response reviewing manager 550 as described with reference to FIG. 5.

A method for content generation by an apparatus is described. The method may include obtaining, at a content generation system comprising a plurality of agents, a user input comprising a plain-text query, generating, by a first actor agent of the plurality of agents and using the plain-text query, a layout comprising one or more sections to be augmented using content obtained from one or more information sources, obtaining, by a second actor agent after generating the plain-text query and using the layout and the plain-text query, the content comprising information from one or more information sources, outputting, by a first critic agent using the layout and the content as input, a message indicating that the content supports the one or more sections of the layout, generating, by a third actor agent after the message is output by the first critic agent, a draft query response using at least a portion of the content and the layout, outputting, by a second critic agent and using one or more input prompts comprising content guidelines, one or more plain-text messages related to a quality of the draft query response, and outputting, by the third actor agent and using the one or more plain-text messages, a revised draft query response.

An apparatus for content generation is described. The apparatus may include one or more memories storing processor executable code, and one or more processors coupled with the one or more memories. The one or more processors may individually or collectively be operable to execute the code to cause the apparatus to obtain, at a content generation system comprising a plurality of agents, a user input comprising a plain-text query, generate, by a first actor agent of the plurality of agents and using the plain-text query, a layout comprising one or more sections to be augmented using content obtained from one or more information sources, obtain, by a second actor agent after generating the plain-text query and using the layout and the plain-text query, the content comprising information from one or more information sources, output, by a first critic agent using the layout and the content as input, a message indicating that the content supports the one or more sections of the layout, generate, by a third actor agent after the message is output by the first critic agent, a draft query response using at least a portion of the content and the layout, output, by a second critic agent and using one or more input prompts comprising content guidelines, one or more plain-text messages related to a quality of the draft query response, and output, by the third actor agent and using the one or more plain-text messages, a revised draft query response.

Another apparatus for content generation is described. The apparatus may include means for obtaining, at a content generation system comprising a plurality of agents, a user input comprising a plain-text query, means for generating, by a first actor agent of the plurality of agents and using the plain-text query, a layout comprising one or more sections to be augmented using content obtained from one or more information sources, means for obtaining, by a second actor agent after generating the plain-text query and using the layout and the plain-text query, the content comprising information from one or more information sources, means for outputting, by a first critic agent using the layout and the content as input, a message indicating that the content supports the one or more sections of the layout, means for generating, by a third actor agent after the message is output by the first critic agent, a draft query response using at least a portion of the content and the layout, means for outputting, by a second critic agent and using one or more input prompts comprising content guidelines, one or more plain-text messages related to a quality of the draft query response, and means for outputting, by the third actor agent and using the one or more plain-text messages, a revised draft query response.

A non-transitory computer-readable medium storing code for content generation is described. The code may include instructions executable by one or more processors to obtain, at a content generation system comprising a plurality of agents, a user input comprising a plain-text query, generate, by a first actor agent of the plurality of agents and using the plain-text query, a layout comprising one or more sections to be augmented using content obtained from one or more information sources, obtain, by a second actor agent after generating the plain-text query and using the layout and the plain-text query, the content comprising information from one or more information sources, output, by a first critic agent using the layout and the content as input, a message indicating that the content supports the one or more sections of the layout, generate, by a third actor agent after the message is output by the first critic agent, a draft query response using at least a portion of the content and the layout, output, by a second critic agent and using one or more input prompts comprising content guidelines, one or more plain-text messages related to a quality of the draft query response, and output, by the third actor agent and using the one or more plain-text messages, a revised draft query response.

Some examples of the method, apparatus, and non-transitory computer-readable medium described herein may further include operations, features, means, or instructions for outputting, by the first critic agent, a message indicating that the content does not support at least one of the one or more sections of the layout and obtaining, by the second actor agent, additional content from the one or more information sources in accordance with the message.

Some examples of the method, apparatus, and non-transitory computer-readable medium described herein may further include operations, features, means, or instructions for generating, by the third actor agent, the revised draft query response in accordance with the one or more plain-text messages and outputting, by the second critic agent, one or more additional plain-text messages related to a quality of the revised draft query response in accordance with the one or more input prompts comprising the content guidelines.

Some examples of the method, apparatus, and non-transitory computer-readable medium described herein may further include operations, features, means, or instructions for performing, by the second actor agent, a check procedure of the content, wherein performing the check procedure comprises determining whether the information may be included in at least two of the one or more information sources.

Some examples of the method, apparatus, and non-transitory computer-readable medium described herein may further include operations, features, means, or instructions for storing, by the second actor agent, the content in a first memory, wherein the first memory may be accessible by the second actor agent, the first critic agent, and the third actor agent and processing, by the first critic agent after the content may be stored in the first memory, the content to determine whether the content supports the one or more sections of the layout.

Some examples of the method, apparatus, and non-transitory computer-readable medium described herein may further include operations, features, means, or instructions for storing, by the third actor agent, the draft query response in a second memory, wherein the second memory may be accessible by the third actor agent and the second critic agent and processing, by the second critic agent after the content may be stored in the second memory, the draft query response for generating the one or more plain-text messages.

In some examples of the method, apparatus, and non-transitory computer-readable medium described herein, generating the draft query response may include operations, features, means, or instructions for generating, by the third actor agent, the draft query response using both the one or more input prompts comprising the content guidelines and the at least one portion of the content.

In some examples of the method, apparatus, and non-transitory computer-readable medium described herein, the one or more input prompts comprising the content guidelines comprise grammar guidelines, language to be included from the draft query response, language to be excluded from the draft query response, formatting guidelines, or any combination thereof.

In some examples of the method, apparatus, and non-transitory computer-readable medium described herein, the one or more information sources comprise one or more publicly available information sources, one or more internal information sources, or both.

In some examples of the method, apparatus, and non-transitory computer-readable medium described herein, the first actor agent, the second actor agent, the third actor agent, the first critic agent, the second critic agent, or any combination thereof may be respective derivations of a large language model.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a"

using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for content generation, comprising:
obtaining, at a content generation system comprising a plurality of agents, a user input comprising a plain-text query;
generating, by a first actor agent of the plurality of agents and using the plain-text query, a layout comprising one or more sections to be augmented using content obtained from one or more information sources;
obtaining, by a second actor agent after generating the plain-text query and using the layout and the plain-text query, the content comprising information from one or more information sources;
outputting, by a first critic agent using the layout and the content as input, a message indicating that the content supports the one or more sections of the layout;
generating, by a third actor agent after the message is output by the first critic agent, a draft query response using at least a portion of the content and the layout;
outputting, by a second critic agent and using one or more input prompts comprising content guidelines, one or more plain-text messages related to a quality of the draft query response; and outputting, by the third actor agent and using the one or more plain-text messages, a revised draft query response.

2. The method of claim 1, further comprising:
outputting, by the first critic agent, a message indicating that the content does not support at least one of the one or more sections of the layout; and
obtaining, by the second actor agent, additional content from the one or more information sources in accordance with the message.

3. The method of claim 1, further comprising:
generating, by the third actor agent, the revised draft query response in accordance with the one or more plain-text messages; and
outputting, by the second critic agent, one or more additional plain-text messages related to a quality of the revised draft query response in accordance with the one or more input prompts comprising the content guidelines.

4. The method of claim 1, further comprising:
performing, by the second actor agent, a check procedure of the content, wherein performing the check procedure comprises determining whether the information is included in at least two of the one or more information sources.

5. The method of claim 1, further comprising:
storing, by the second actor agent, the content in a first memory, wherein the first memory is accessible by the second actor agent, the first critic agent, and the third actor agent; and
processing, by the first critic agent after the content is stored in the first memory, the content to determine whether the content supports the one or more sections of the layout.

6. The method of claim 1, further comprising:
storing, by the third actor agent, the draft query response in a second memory, wherein the second memory is accessible by the third actor agent and the second critic agent; and
processing, by the second critic agent after the content is stored in the second memory, the draft query response for generating the one or more plain-text messages.

7. The method of claim 1, wherein generating the draft query response comprises:
generating, by the third actor agent, the draft query response using both the one or more input prompts comprising the content guidelines and the at least the portion of the content.

8. The method of claim 1, wherein the one or more input prompts comprising the content guidelines comprise grammar guidelines, language to be included from the draft query response, language to be excluded from the draft query response, formatting guidelines, or any combination thereof.

9. The method of claim 1, wherein the one or more information sources comprise one or more publicly available information sources, one or more internal information sources, or both.

10. The method of claim 1, wherein the first actor agent, the second actor agent, the third actor agent, the first critic agent, the second critic agent, or any combination thereof are respective derivations of a large language model.

11. An apparatus for content generation, comprising:
one or more memories storing processor-executable code; and
one or more processors coupled with the one or more memories and individually or collectively operable to execute the code to cause the apparatus to:

obtain, at a content generation system comprising a plurality of agents, a user input comprising a plain-text query;

generate, by a first actor agent of the plurality of agents and using the plain-text query, a layout comprising one or more sections to be augmented using content obtained from one or more information sources;

obtain, by a second actor agent after generating the plain-text query and using the layout and the plain-text query, the content comprising information from one or more information sources;

output, by a first critic agent using the layout and the content as input, a message indicating that the content supports the one or more sections of the layout;

generate, by a third actor agent after the message is output by the first critic agent, a draft query response using at least a portion of the content and the layout;

output, by a second critic agent and using one or more input prompts comprising content guidelines, one or more plain-text messages related to a quality of the draft query response; and output, by the third actor agent and using the one or more plain-text messages, a revised draft query response.

12. The apparatus of claim 11, wherein the one or more processors are individually or collectively further operable to execute the code to cause the apparatus to:

output, by the first critic agent, a message indicating that the content does not support at least one of the one or more sections of the layout; and obtain, by the second actor agent, additional content from the one or more information sources in accordance with the message.

13. The apparatus of claim 11, wherein the one or more processors are individually or collectively further operable to execute the code to cause the apparatus to:

generate, by the third actor agent, the revised draft query response in accordance with the one or more plain-text messages; and output, by the second critic agent, one or more additional plain-text messages related to a quality of the revised draft query response in accordance with the one or more input prompts comprising the content guidelines.

14. The apparatus of claim 11, wherein the one or more processors are individually or collectively further operable to execute the code to cause the apparatus to:

perform, by the second actor agent, a check procedure of the content, wherein performing the check procedure comprises determining whether the information is included in at least two of the one or more information sources.

15. The apparatus of claim 11, wherein the one or more processors are individually or collectively further operable to execute the code to cause the apparatus to:

store, by the second actor agent, the content in a first memory, wherein the first memory is accessible by the second actor agent, the first critic agent, and the third actor agent; and process, by the first critic agent after the content is stored in the first memory, the content to determine whether the content supports the one or more sections of the layout.

16. The apparatus of claim 11, wherein the one or more processors are individually or collectively further operable to execute the code to cause the apparatus to:

store, by the third actor agent, the draft query response in a second memory, wherein the second memory is accessible by the third actor agent and the second critic agent; and process, by the second critic agent after the content is stored in the second memory, the draft query response for generating the one or more plain-text messages.

17. The apparatus of claim 11, wherein, to generate the draft query response, the one or more processors are individually or collectively operable to execute the code to cause the apparatus to:

generate, by the third actor agent, the draft query response using both the one or more input prompts comprising the content guidelines and the at least the portion of the content.

18. The apparatus of claim 11, wherein the one or more input prompts comprising the content guidelines comprise grammar guidelines, language to be included from the draft query response, language to be excluded from the draft query response, formatting guidelines, or any combination thereof.

19. The apparatus of claim 11, wherein the one or more information sources comprise one or more publicly available information sources, one or more internal information sources, or both.

20. A non-transitory computer-readable medium storing code for content generation, the code comprising instructions executable by one or more processors to:

obtain, at a content generation system comprising a plurality of agents, a user input comprising a plain-text query;

generate, by a first actor agent of the plurality of agents and using the plain-text query, a layout comprising one or more sections to be augmented using content obtained from one or more information sources;

obtain, by a second actor agent after generating the plain-text query and using the layout and the plain-text query, the content comprising information from one or more information sources;

output, by a first critic agent using the layout and the content as input, a message indicating that the content supports the one or more sections of the layout;

generate, by a third actor agent after the message is output by the first critic agent, a draft query response using at least a portion of the content and the layout;

output, by a second critic agent and using one or more input prompts comprising content guidelines, one or more plain-text messages related to a quality of the draft query response; and output, by the third actor agent and using the one or more plain-text messages, a revised draft query response.

\* \* \* \* \*